United States Patent [19]

Boucherie

[11] Patent Number: 5,609,890
[45] Date of Patent: Mar. 11, 1997

[54] MOLDING MACHINE FOR INJECTION MOLDING OF TOOTH BRUSHES

[75] Inventor: Bart G. Boucherie, Izegem, Belgium

[73] Assignee: G.B. Boucherie N.V., Belgium

[21] Appl. No.: 423,093

[22] Filed: Apr. 18, 1995

[30] Foreign Application Priority Data

Apr. 19, 1994 [GB] United Kingdom .................. 9407735

[51] Int. Cl.$^6$ ........................... B29C 45/06; B29C 45/10; B29C 45/14
[52] U.S. Cl. ...................... 425/120; 425/123; 425/126.1; 425/130; 425/556; 425/588; 425/436 R; 425/453; 425/805; 425/DIG. 201; 264/243; 264/328.8
[58] Field of Search .............................. 425/126.1, 129.1, 425/122, 120, 556, 123, 588, 444, 436 R, 453, 454, 457, 805, 130, DIG. 201; 254/257, 328.8, 243

[56] References Cited

U.S. PATENT DOCUMENTS

| | | | |
|---|---|---|---|
| 2,923,035 | 2/1960 | Schwartz | 425/805 |
| 3,308,112 | 3/1967 | Piotrowski . | |
| 3,466,700 | 8/1969 | Harrison | 425/DIG. 201 |
| 3,804,576 | 4/1974 | Hehl . | |
| 3,832,110 | 8/1974 | Hehl . | |
| 3,936,261 | 2/1976 | Jones et al. | 425/805 |
| 4,244,076 | 1/1981 | Meyer | 264/243 |
| 4,444,711 | 4/1984 | Boucherie . | |
| 4,609,228 | 9/1986 | Bickel | 264/243 |
| 4,635,313 | 1/1987 | Fassler et al. | 264/243 |
| 4,744,742 | 5/1988 | Aoki . | |
| 4,830,811 | 5/1989 | Aoki . | |
| 5,087,403 | 2/1992 | Weihrauch | 264/243 |
| 5,256,048 | 10/1993 | Jacobs et al. . | |
| 5,352,025 | 10/1994 | Huang | 264/243 |

FOREIGN PATENT DOCUMENTS

| | | |
|---|---|---|
| 0463217 | 1/1992 | European Pat. Off. . |
| 0504571 | 2/1992 | European Pat. Off. . |
| 2141799 | 1/1973 | France . |
| 2538297 | 12/1983 | France . |
| 3512192 | 10/1986 | Germany . |
| 4127621 | 2/1993 | Germany . |
| 4243293 | 6/1994 | Germany . |
| 4311186 | 10/1994 | Germany . |
| 2151971 | 7/1985 | United Kingdom . |

*Primary Examiner*—Khanh P. Nguyen
*Attorney, Agent, or Firm*—Sixbey, Friedman, Leedom & Ferguson, P.C.; Gerald J. Ferguson, Jr.

[57] ABSTRACT

For injection molding of tooth brushes from two different molding material components with tufts of bristles incorporated in the head portions of the brush bodies a molding machine is proposed which includes a tuft loading station, a first injecting station associated with the first material component and a second injecting station associated with the second material component. In one or each injecting station, the stationary molding block has a recess, and a movable mold insert part fits into this recess to complete the stationary mold block. The movable mold insert part is provided with tuft insertion holes and can be transferred to the tuft feeding station where tufts of bristles are loaded into the tuft insertion holes so that they have their inner ends projecting into the mold cavity portion defined by the movable mold insert part. Production of tooth brushes is a continuous sequence of tuft loading and injecting steps.

12 Claims, 5 Drawing Sheets

MOLDING MACHINE FOR INJECTION MOLDING OF TOOTH BRUSHES

BACKGROUND OF THE INVENTION

1. Field of the Invention

The present invention relates to a molding machine for injection molding of tooth brushes from two or more different molding material components with inmolded fibre or bristle tufts.

2. Description of the Prior Art

Conventional tooth brushes have a brush body which is injection molded in a single molding step from an appropriate molding material. There is an increasing demand for tooth brushes with a brush body made from different materials. For example, the brush body may have particular zones for enhancement of the grip or feeling, or decorative elements incorporated therein. These elements are molded from a material which is different in nature, color, hardness, or other properties, from the molding material wherefrom the base part of the brush body is molded. In order to produce such brush bodies by injection molding, the molding must be carried out with at least two different molding material components in at least two injecting stations, each of these injecting stations being associated with a different one of the molding material components.

In EP-0 504 571 A1 a molding machine for injection molding of tooth brushes from two different molding material components is disclosed. The machine comprises two injecting stations each associated with a different one of the two components. The first injecting station has a mold cavity corresponding in shape to the base part of the tooth brush bodies, including a handle portion and a head portion. The second injecting station has a mold cavity corresponding in shape to the requirements of the second molding material component. Each mold cavity is defined by a fixed mold part and a movable mold part. The fixed mold part has a recess, and a mold insert part fits into the recess to complete the fixed mold part. The insert part is mounted on a movable carrier and has an extension which, when the mold is closed, projects into the mold cavity defined therebetween. The carrier is used to transfer the blank molded in the first injecting station to the cavity of the second injecting station, the blank being held on the carrier by the extension of the mold insert part penetrating into the blank. Only the cavity of the first injecting station needs to be provided with an array of pins extending into the head portion of the cavity to provide the molded blank with a pattern of holes for implantation of brush bristles after completion of the molding steps. For a complete manufacture of tooth brushes, the finished brush bodies are then supplied to a conventional brush filling machine where tufts of bristles are forced into the holes of the brush body head portion and fixed therein with a piece of metal, generally referred to as an anchor. The brush filling machine may comprise further processing stations such as bristle trimming, roundening and polishing stations.

SUMMARY OF THE INVENTION

An object of the present invention is to provide a molding machine for injection molding of tooth brush bodies from at least two different molding material components, wherein a separate brush filling machine is not required, the brush bristles being incorporated in the brush body head portion during the first injection molding step already.

According to the invention, the molding machine comprises at least two injecting stations associated with a different one of the molding material components. A first one of these injecting stations has a mold cavity corresponding in shape to a base part of the tooth brush bodies including a handle portion and a head portion. A second one of the injecting stations has a mold cavity corresponding in shape to the requirements of the second molding material component. Each of these mold cavities is defined by relatively movable mold parts, one of these mold parts being divided to comprise a base member and a movable mold insert part which, when joined to the base member, completes the first mentioned one mold part. The molding machine further comprises a tuft feeding station, and the movable mold insert part has a plurality of tuft insertion holes arranged in a pattern corresponding to the tuft pattern of tooth brushes to be produced. The mold insert part is movable between a first position in the tuft feeding station to receive a tuft of bristles in each tuft insertion hole so that an end thereof projects into a cavity portion defined by the movable mold insert part, a second position joined with the base member of the first mentioned one mold part in the first injecting station, and a third position joined with the base member of the one mold part in the second injecting station. Each of the tuft ends is embedded in molding material of the first component upon injection thereof into the cavity of the first injecting station. Thus, the required tufts of bristles for each tooth brush are supplied to the movable insert part in a tuft feeding station which may form part of, or at least can be closely associated with, the molding machine. Production of finished tooth brushes is a continuous sequence of steps, starting with the tuft feeding step and ending with the last injecting step. If pre-finished bristles are supplied, i.e. bristles with rounded and polished ends, no further finishing step is required.

In the preferred embodiment, the tuft feeding station comprises a heating device for fusing the tuft ends projecting into the cavity portion defined by the movable mold insert part, forming knobs of molten bristle material. These knobs of molten bristle material are then embedded in the first molding material component, filling the brush head portion of the mold cavity. Thus, each tuft of bristles is safely anchored in the head portion of the finished tooth brush.

When the mold blanks formed in the first injecting station are transferred to the second and each further injecting station, they are preferably retained on the movable mold insert part by engagement of the embedded tufts of bristles in the tuft insertion holes. In contrast to the plural component molding machine of EP-0 504 571 A1, separate extensions on the mold insert part projecting into the mold cavity can be dispensed with. Further advantage can be taken from the fact that the tufts of bristles remain engaged in the tuft insertion holes of the movable mold insert part until after the last injecting step is completed. By introducing plunger members into each tuft insertion hole from the side opposite the mold cavity, ejection of finished tooth brushes from the mold cavity of the last injecting station can at least be assisted.

The invention provides a number of embodiments with specific configurations of multiple mold cavities in the injecting stations, including particular arrangements of the tuft feeding station. In selecting among the various embodiments, which will be further disclosed hereinafter, ease of manufacture and efficiency of production are the main considerations.

BRIEF DESCRIPTION OF THE DRAWING

Further features and advantages of the invention will become apparent from the following description of preferred embodiments with reference to the drawings, wherein.

DESCRIPTION OF PREFERRED EMBODIMENTS

Figure 1:
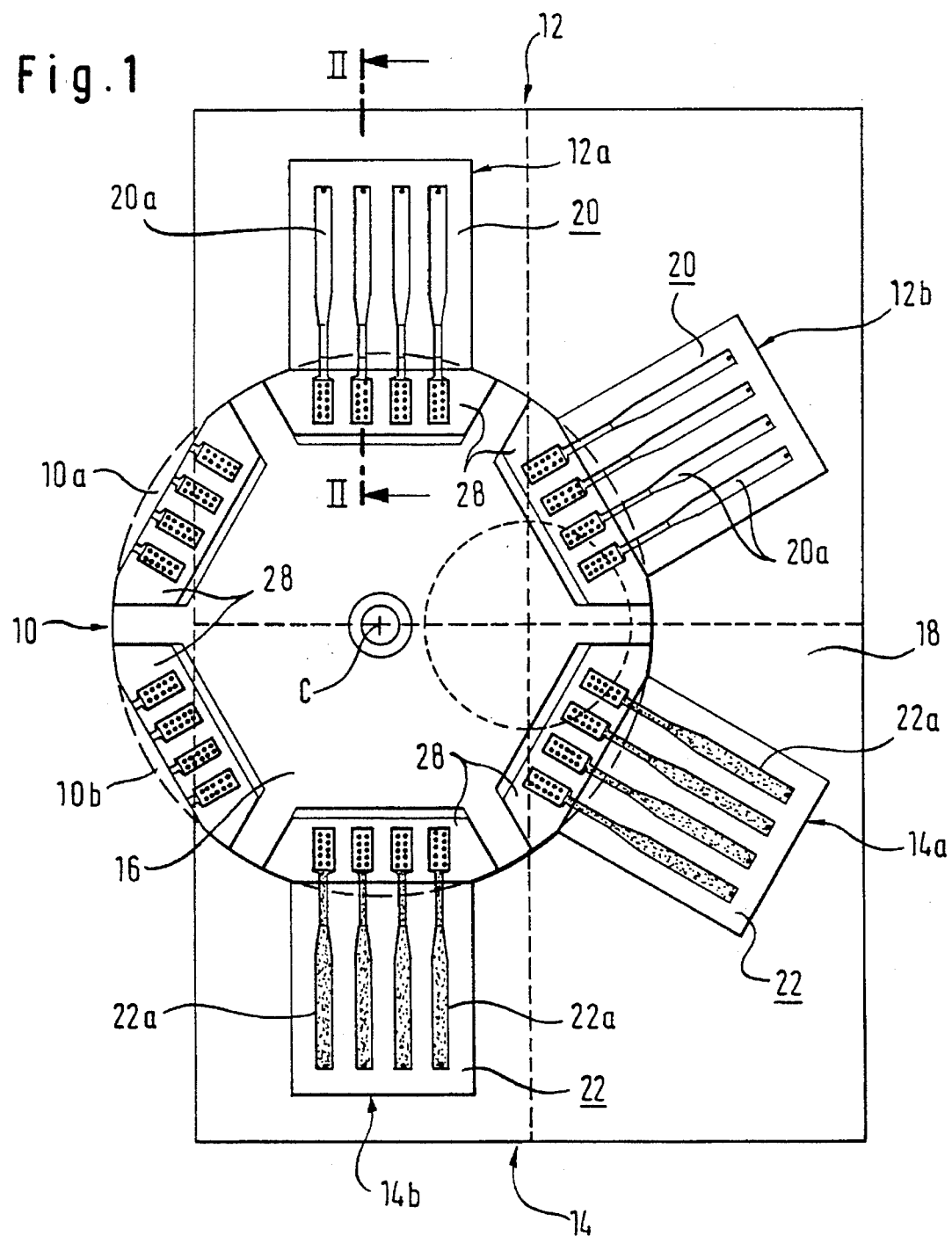
FIG. 1 is a schematic plan view of a first embodiment of the molding machine.

The first embodiment of the molding machine shown in FIG. 1 comprises a tuft feeding station 10, a first injection station 12 and a second injection station 14. Each of the stations 10, 12 and 14 is in fact composed of a pair of adjacent and symmetrically arranged station sections; thus, the tuft feeding station 10 comprises tuft feeding sections 10a and 10b, the first injecting station 12 comprises sections 12a and 12b, and injection station 14 comprises sections 14a and 14b. Stations 10, 12 and 14 are provided in a generally circular and symmetrical arrangement with respect to the center C of a rotary indexing table 16. The rotary indexing table 16 is mounted in a machine frame 18 which carries a number of stationary mold blocks 20 in the first injecting station 12 and 22 in the second injecting station 14. Each mold block 20, 22 has four parallel mold cavities 20a and 22a, respectively, formed therein in a closely spaced and parallel relationship, each of these mold cavities 20a and 22a consisting of an outer brush body handle portion and an inner brush body head portion connected by a neck portion. In the representation of FIG. 1, no movable mold parts cooperating with the stationary mold blocks 20 and 22 are shown. Thus, the shape of the mold cavities 20a and 22a is readily apparent. As is easily seen, the mold cavities 20a and 22a are in the shape of tooth brushes.

Figure 2:
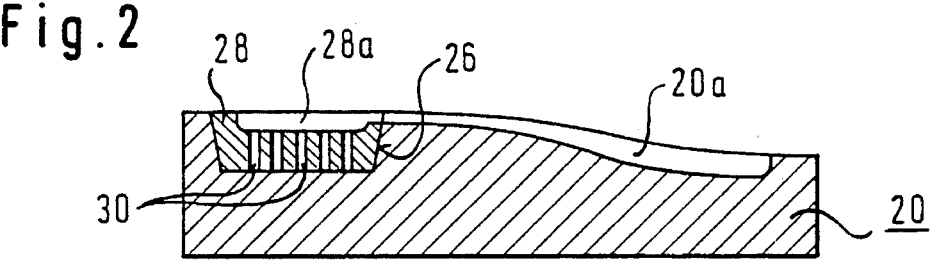
FIG. 2 is a sectional view along line II—II in FIG. 1.

One of the stationary mold blocks 20 is shown in FIG. 2. Again, the tooth brush shape of cavity 20a is well apparent. The stationary mold block 20 has a recess 26 corresponding to the head portion of the brush body to be formed. A movable mold insert part 28 fits into the recess 26 and has a cavity portion 28a corresponding to the head portion of the brush body and completing the remainder of the cavity 20a in the stationary mold block 20. Although not shown in the drawings, each stationary mold block 22 has a similar recess for fitting accommodation of a movable mold insert part 28. The movable insert part 28 is provided with a number of tuft insertion holes 30 arranged in a pattern corresponding to the pattern of tufts of bristles in the tooth brushes to be produced. As seen in FIG. 2, the tuft insertion holes 30 extend through the thickness of the mold insert part 28 and open into the cavity portion 28a.

Figure 3:
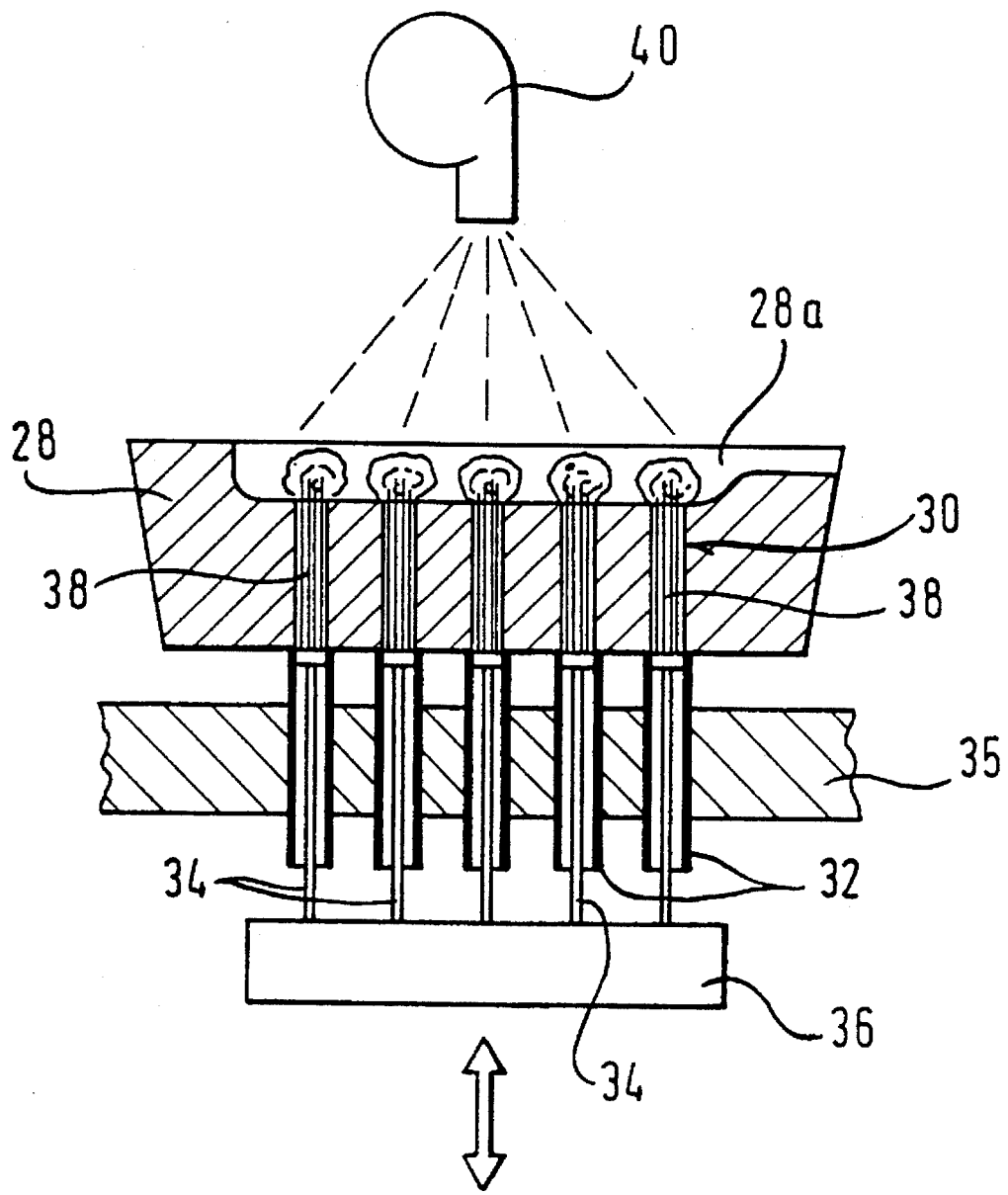
FIG. 3 is an enlarged view of a movable mold insert part in a tuft feeding station.

In the tuft feeding station 10 shown in FIG. 3, the mold insert part 28 is separated from each of the stationary mold blocks 20, 22 and has its tuft insertion holes 30 presented to a set of tuft feeding tubes 32. The tuft feeding tubes 32 are arranged in a pattern corresponding to that of the tuft insertion holes 30 and are held in a guide plate 35. As further seen in FIG. 3, a plunger member 34 extends into each of the tuft feeding tubes 32 and with a forward end partly into a corresponding tuft insertion hole 30. The plunger members 34 are attached to a reciprocating pusher block 36. In the condition shown in FIG. 3, tufts of bristles 38 have been fully introduced into the tuft insertion holes 30 so that their forward ends project into the mold cavity portion 28a. The projecting ends of the bristles are then exposed to heat from a hot air gun 40 or a heating plate (not shown) to fuse the material of the bristles and to form individual knobs of molten bristle material at the end of each tuft 38 projecting into the cavity portion 28a.

In operation of the molding machine, and as a first step of brush production, tufts of bristles 38 are loaded into a pair of movable mold insert parts 28 in the tuft feeding station 10. Eventually, the tufts of bristles are profiled and/or trimmed in addition to the loading and fusing step illustrated in FIG. 3. The indexing table 16 is now rotated over 120 degrees, whereby the insert parts 28 loaded with tufts of bristles 38 are transferred to the first injecting station 12. Simultaneously, a pair of insert parts 28 is moved from the first injecting station 12 to the second injecting station 14, and a pair of insert parts 28 is moved to the feeding station 10 after ejection of the finished tooth brushes. In the first injecting station 12, the mold insert parts 28 are engaged in the recesses 26 of the mold blocks 20, and the mold cavities 20a are closed by lowering corresponding movable mold parts (not shown) until they abut the stationary mold blocks 20. The first molding material component is now injected into the mold cavities 20a. The injected material flows around the knobs of molten bristle material projecting into the cavity portion 28a. Pressure within the cavity 20a and acting on the tufts of bristles 38 by developing an axial force tending to push the tufts outwardly of the mold cavity is resisted by plunger members similar to the plunger members 34 shown in FIG. 3 and against which the outer ends of the tufts 38 abut.

After completion of the first injecting step, the movable mold insert parts 28 are lifted from the mold blocks 20, with the tufts 38 remaining engaged in the tuft insertion holes 30 so that the blanks molded in the first injecting station 12 are held and retained on the movable insert parts 28 during transfer to the second injecting station 14.

In the second injecting station 14, the insert parts 28 with the blanks molded in the first injecting station 12 are accommodated in the recesses 26 and the cavity portions 22a of the stationary mold blocks 22, and the mold cavities 22a are closed by lowering corresponding movable mold parts (not shown) until they abut the stationary mold blocks 22. The second molding material component is now injected into the cavities 22a. Simultaneously, a new blank is produced in the first injecting station 12. After completion of the second injecting step, the molds in the second injecting station 14 are opened, and the movable insert parts 28 with finished tooth brushes held thereon are lifted from the stationary mold blocks 22 and presented to a collecting station intermediate the second injecting station 14 and the tuft feeding station 10, and finished tooth brushes are ejected from the movable mold insert parts 28 by means of plunger members similar to the plunger members 34 in FIG. 3, which are advanced into the tuft insertion holes 30 to push the tufts of bristles 38 out of these holes. This particular way in which finished tooth brushes are ejected is advantageous in that, since the ejecting plunger members only engage the free ends of the tufts, no mark from an ejection pusher remains on the body portion of the finished tooth brushes.

Figure 4:
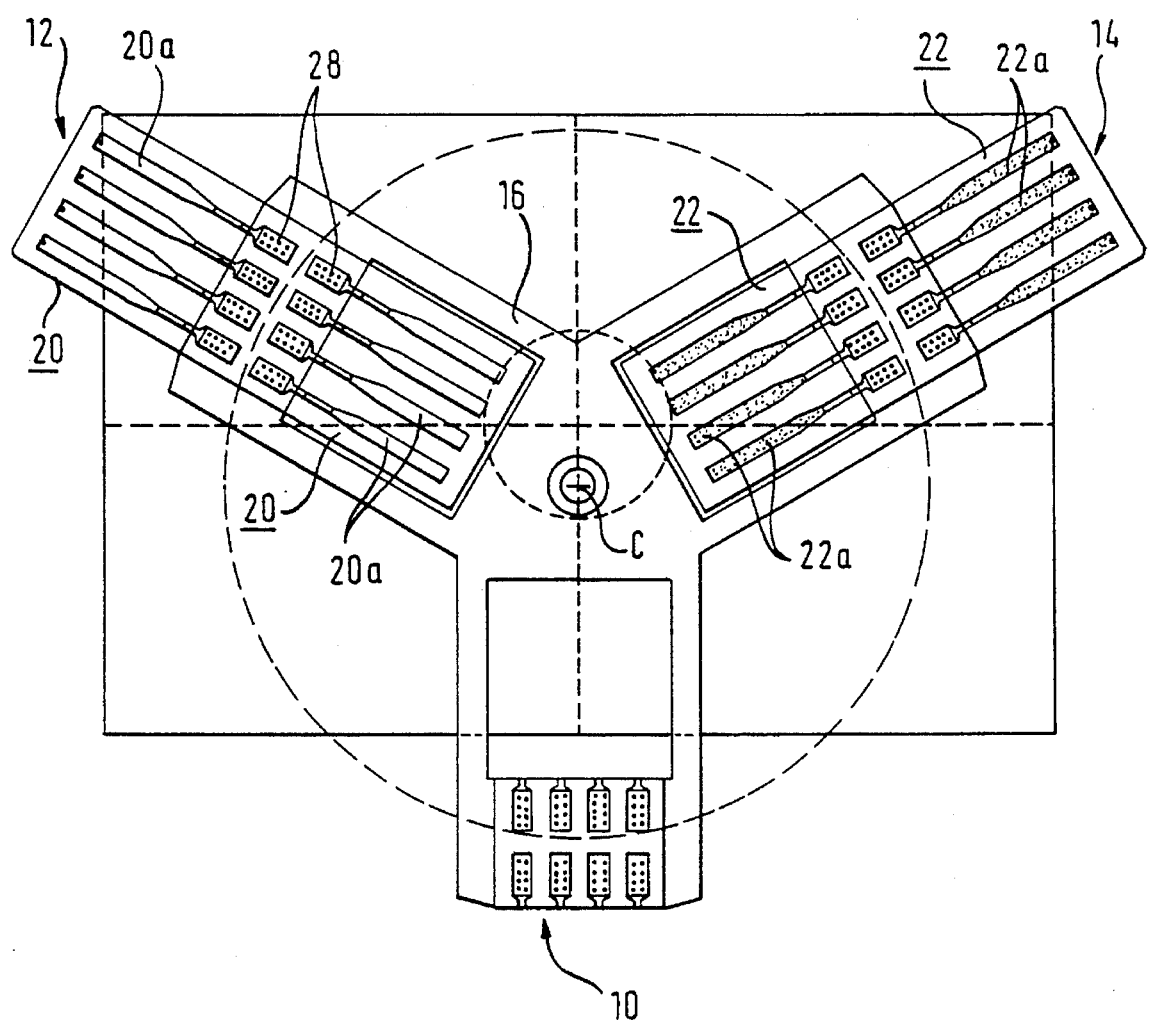
FIGS. 4, 5 and 6 are schematic plan views of further embodiments of the invention.

In the embodiment shown in FIG. 4, the stationary mold blocks 20 and 22 in the first and second injecting stations 12, 14 are radially aligned with respect to the center C of the indexing table 16. The mold cavities 20a and 22a are oriented so that the head portions are located in a common movable mold insert part 28. Thus, a single mold insert part 28 is used for both mold blocks in each injecting station. Operation of the molding machine in this embodiment is similar to that disclosed with respect to the embodiment of FIG. 1.

Figure 5:
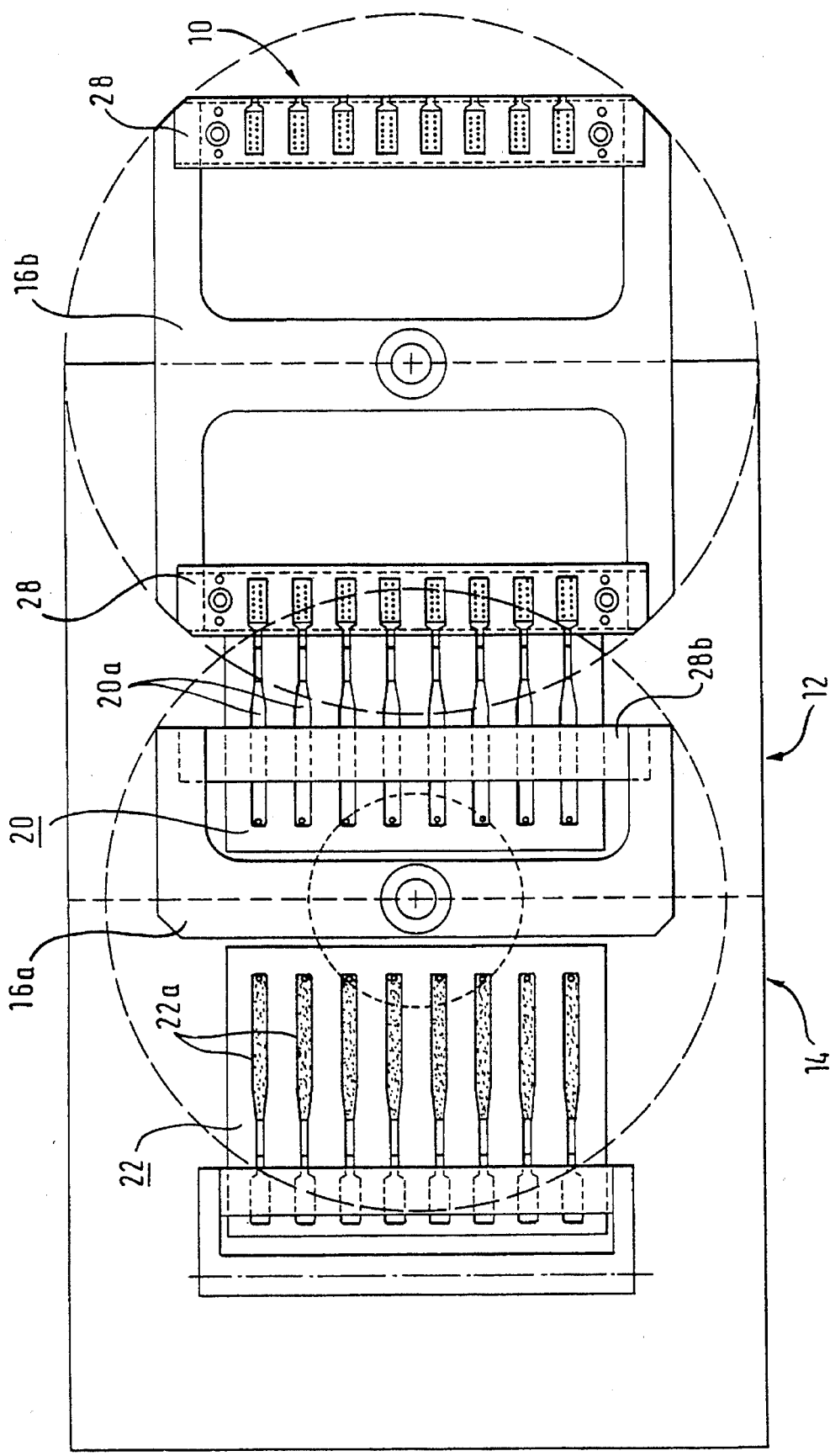

In the embodiment of FIG. 5, each of the injecting stations 12, 14 comprises a single stationary mold block 20, 22 with an increased number of mold cavities 20a, 22a in a closely spaced parallel relationship. The mold blocks 20, 22 are located on diametrically opposite sides with respect to the center of a first indexing member 16a. The indexing member 16a is used for the transfer of blanks molded in the first injecting station 12 into the cavities 22a of the second mold block 22, only. A second rotary indexing member 16b is used for the transfer of a movable mold insert part 28 from the tuft feeding station 10 to the first injecting station 12. In this embodiment, the movable mold insert part 28 fits into a recess of the mold block 20 of the first injecting station 12, only. Another movable mold insert part 28b carried by the indexing member 16a fits into another recess of the mold block 20 and has small projections thereon which extend into the cavities 20a. These projections are used to hold the blanks molded in the first injecting station 12 attached to the movable insert part 28b during transfer into the cavities 22a of the second mold block 22.

In this respect, this embodiment is similar to EP-0 504 571 A1 mentioned earlier.

Figure 6:
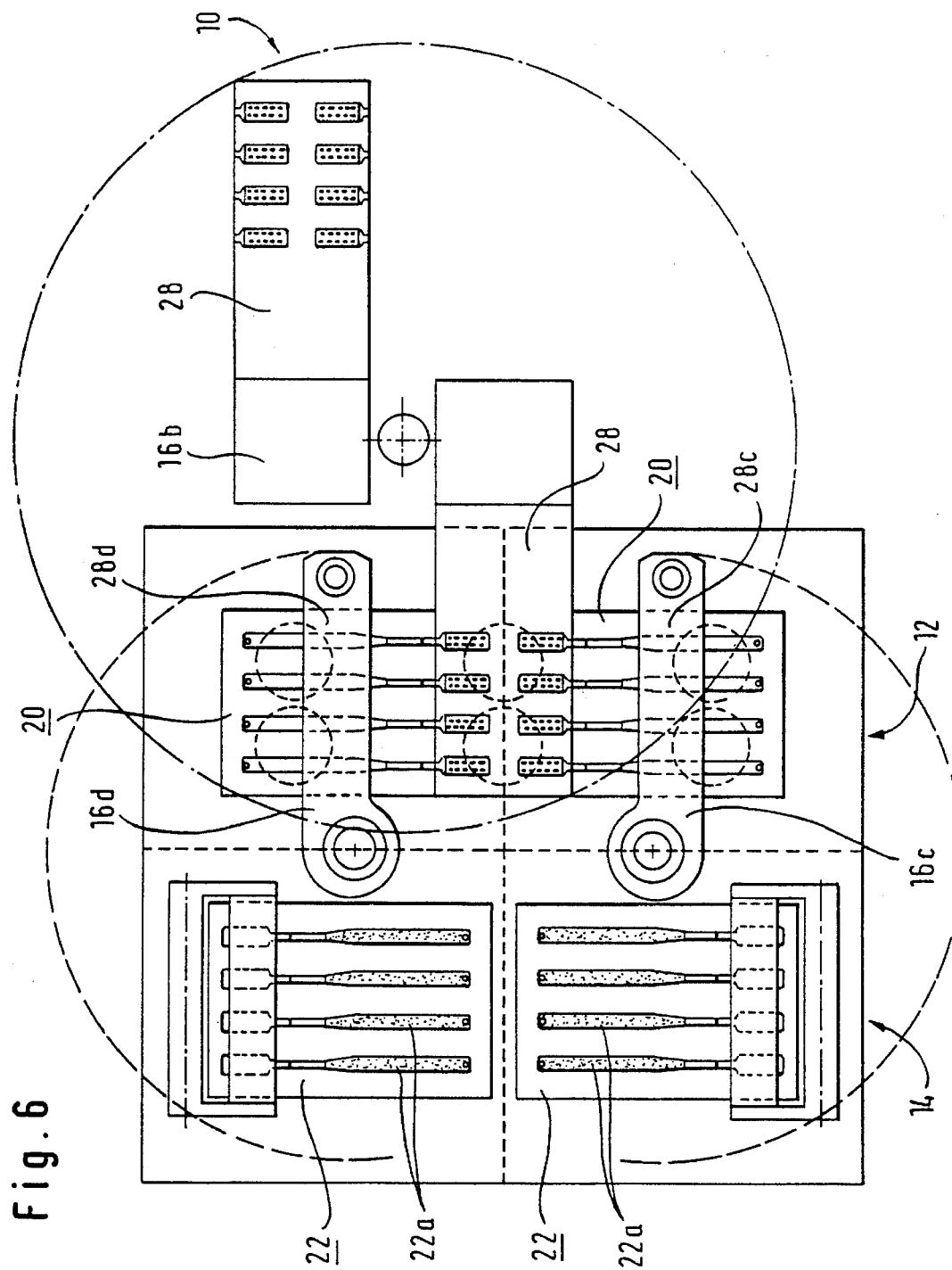

The same basic concept is used in the embodiment shown in FIG. 6. However, in this embodiment, each injecting station 12, 14 includes a pair of mold blocks 20, 22, and a pair of indexing arms 16c and 16d is used for the transfer of blanks molded in the first mold blocks 20 to the cavities 22a of the second mold blocks 22. Each indexing arm 16c, 16d carries a movable insert part 28c and 28d, similar to insert part 28b in the embodiment of FIG. 5. A separate indexing table 16b is used for the transfer of movable insert part 28 from the tuft feeding station 10 to the mold blocks 20 of the first injecting station.

In operation of the embodiment shown in FIG. 6, the indexing member 16b may rotate clockwise or counterclockwise for the transfer of a movable insert part 28 loaded with tufts of bristles from the tuft feeding station 10 to the first injecting station 12 and back to the tuft feeding station. The indexing arm 16d rotates counterclockwise, and the indexing arm 16c rotates clockwise for the transfer of blanks molded in the first injecting station into the cavities 22a of the second injecting station 14. Return movement of the indexing arm 16d to the first injecting station 12 is clockwise, and return movement of the second indexing arm 16c is counterclockwise.

The embodiment of FIG. 6 is advantageous in that it has a compact configuration, allowing an increased number of tooth brushes to be molded simultaneously in a given space.

I claim:

1. A molding machine for injection molding of tooth brushes from at least two different molding material components, comprising at least two injecting stations each associated with a different one of said components, a first one of said injecting stations having a mold cavity with a first cavity portion having the shape of a toothbrush handle and a second cavity portion having the shape of a toothbrush head, and a second one of said injecting stations having a mold cavity corresponding in shape to requirements of the second molding material component, each of said mold cavities being defined by relatively movable mold parts, one of said mold parts of each injecting station being divided to comprise a base member with a recess and a movable mold insert part fitting into said recess and which when joined to said base member completes said one mold pan, and the machine further comprising a tuft feeding station, said movable mold insert part defining said first cavity portion and having a plurality of tuft insertion holes arranged in a pattern corresponding to the tuft pattern of tooth brushes to be produced and being movable between a tuft feeding station to receive a tuft of bristles in each tuft insertion hole so that an end thereof projects into said cavity portion, a second position joined with the base member of the one mold part in the first injecting station and a third position joined with the base member of the one mold part in the second injecting station, each of said tuft ends being embedded in molding material of the first component upon injection thereof into the cavity of the first injecting station.

2. The molding machine of claim 1, wherein the tuft feeding station comprises a heating device for fusing the tuft ends projecting into the cavity portion defined by the movable mold insert part, forming knobs of molten bristle material.

3. The molding machine of claim 1, wherein the base part of the tooth brush body molded in the cavity of the first injecting station is retained on the movable mold insert part by engagement of the embedded tufts of bristles in the tuft insertion holes.

4. The molding machine of claim 1, wherein at least during injection of the first molding material component in the first injecting station the ends of the tufts opposite those projecting into the cavity are engaged and held by plunger members partly penetrating into the respective tuft insertion holes to resist pressure from the material being injected.

5. The molding machine of claim 1, wherein plunger members are advanced into said tuft insertion holes after completion of the last injecting step to eject finished brush bodies with tufts of bristles embedded in the head portion.

6. The molding machine of claim 1, wherein a like plurality of cavities are arranged in a closely adjacent relationship in each of said injecting stations and said tuft feeding station.

7. The molding machine of claim 1, wherein a number of like movable mold insert parts corresponding to the number of injecting stations plus one for the tuft feeding station are mounted on a common carrier, said carrier performing indexing movements to move said movable mold insert parts simultaneously from one station to a respective adjacent station.

8. The molding machine of claim 1, wherein said injecting stations and said tuft feeding station are provided in a generally circular arrangement.

9. The molding machine of claim 8, wherein said circular arrangement comprises at least one pair of each of said injecting stations and at least one pair of tuft feeding stations.

10. The molding machine of claim 6, wherein at least two movable mold insert parts are mounted on an indexing carrier which moves one of said insert parts to said tuft feeding station while the other is moved to the first injecting station and vice versa.

11. The molding machine of claim 10, wherein at least one further indexing carrier is provided for moving base parts of brush bodies molded in the first injecting station with tufts of bristles embedded therein to the second injecting station.

12. The molding machine of claim 10, wherein a pair of further indexing carriers is provided which perform pivotal indexing movements in opposite senses and each move half of the total number of base parts of brush bodies molded in the first injecting station to one of a pair of second injecting stations.

\* \* \* \* \*

UNITED STATES PATENT AND TRADEMARK OFFICE
CERTIFICATE OF CORRECTION

PATENT NO. : 5,609,890
DATED : March 11, 1997
INVENTOR(S) : Bart G. BOUCHERIE

It is certified that error appears in the above-indentified patent and that said Letters Patent is hereby corrected as shown below:

Column 5, line 65, change "pan" to --part--.

Column 5, line 67, change "said first cavity portion" to --said second cavity portion--.

Signed and Sealed this

Twelfth Day of October, 1999

Attest:

Q. TODD DICKINSON

*Attesting Officer*  *Acting Commissioner of Patents and Trademarks*